United States Patent
Fukuya et al.

(10) Patent No.: US 10,298,829 B2
(45) Date of Patent: May 21, 2019

(54) IMAGE PICKUP APPARATUS, OPERATION APPARATUS, IMAGE PICKUP SYSTEM, AND IMAGE PICKUP METHOD

(71) Applicant: OLYMPUS CORPORATION, Hachioji-shi, Tokyo (JP)

(72) Inventors: Yoshiyuki Fukuya, Sagamihara (JP); Kazuhiko Shimura, Hachioji (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/623,262

(22) Filed: Jun. 14, 2017

(65) Prior Publication Data

US 2017/0366733 A1 Dec. 21, 2017

(30) Foreign Application Priority Data

Jun. 17, 2016 (JP) .................................. 2016-120964

(51) Int. Cl.
| | |
|---|---|
| *H04N 5/232* | (2006.01) |
| *G06F 3/0488* | (2013.01) |
| *G06F 3/0484* | (2013.01) |

(52) U.S. Cl.
CPC ....... *H04N 5/23206* (2013.01); *G06F 3/0488* (2013.01); *G06F 3/04847* (2013.01); *H04N 5/23216* (2013.01); *H04N 5/23293* (2013.01)

(58) Field of Classification Search
CPC ........ G06F 21/35; G06F 21/43; G06F 3/1683; G08B 13/1966; H04N 1/00103–1/00108; H04W 84/12

USPC .......... 348/207.1, 207.11, 211.8; 396/56–59
See application file for complete search history.

(56) References Cited

U.S. PATENT DOCUMENTS

| | | | | |
|---|---|---|---|---|
| 7,856,248 | B1* | 12/2010 | Fujisaki ................ | H04M 1/575 455/414.1 |
| 2003/0202101 | A1* | 10/2003 | Monroe ........... | G08B 13/19689 348/156 |
| 2006/0203097 | A1* | 9/2006 | Koga ................. | H04N 5/23203 348/211.3 |
| 2007/0128899 | A1* | 6/2007 | Mayer ................... | G06F 9/4406 439/152 |
| 2010/0225653 | A1* | 9/2010 | Sao ......................... | H04L 51/38 345/520 |
| 2012/0307080 | A1* | 12/2012 | Yumiki .............. | H04N 5/23203 348/207.11 |

(Continued)

FOREIGN PATENT DOCUMENTS

JP 2006-270263 A 10/2006

*Primary Examiner* — Xi Wang
(74) *Attorney, Agent, or Firm* — Volpe and Koenig, P.C.

(57) ABSTRACT

An image pickup apparatus includes, an imaging element configured to generate image data by picking up a target object image based on a plurality of control items, a communication circuit configured to communicate with a first operation apparatus and a second operation apparatus, and a CPU configured to discriminate, among the plurality of control items, between a control item which accepts a change by a control signal transmitted from the first operation apparatus and a control item which accepts a change by a control signal transmitted from the second operation apparatus, and control the control item in accordance with the control signal transmitted from the operation apparatus corresponding to the control item.

2 Claims, 9 Drawing Sheets

(56) References Cited

U.S. PATENT DOCUMENTS

2013/0207905 A1\* 8/2013 Hankins ................. G06F 3/041
  345/173
2017/0201715 A1\* 7/2017 Tobita ................ G06K 9/00718

\* cited by examiner

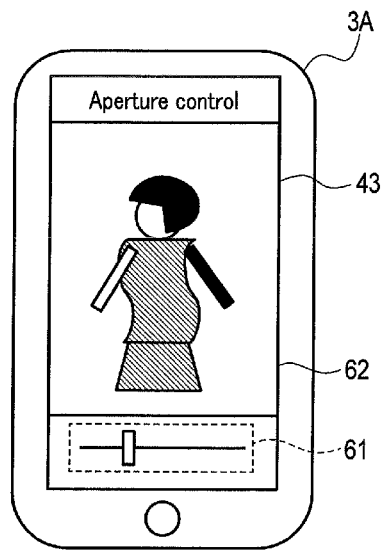
F I G. 4
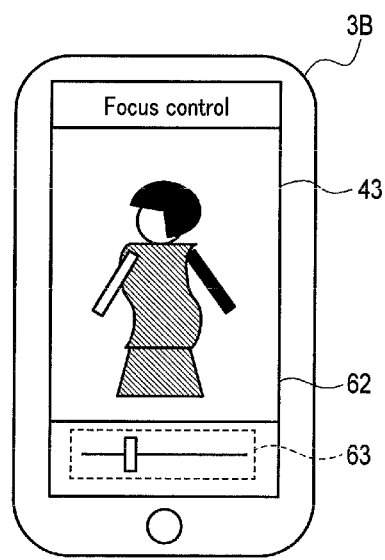
F I G. 5

IMAGE PICKUP APPARATUS, OPERATION APPARATUS, IMAGE PICKUP SYSTEM, AND IMAGE PICKUP METHOD

CROSS-REFERENCE TO RELATED APPLICATIONS

This application is based upon and claims the benefit of priority from the prior Japanese Patent Application No. 2016-120964, filed Jun. 17, 2016, the entire contents of which are incorporated herein by reference.

FIELD

Embodiments described herein relate generally to an image pickup apparatus, an operation apparatus, an image pickup system, and an image pickup method.

BACKGROUND

An image pickup apparatus which is configured to be wirelessly communicable with an electronic apparatus (to be referred to as an operation apparatus hereinafter), such as a smartphone or a table PC, including a display unit and an operation unit, and operates under the control of the operation apparatus is generally widespread. The image pickup apparatus is configured as, for example, a lens-style camera with no display unit. Such image pickup apparatus receives a control signal transmitted from the operation apparatus by wireless communication, and performs an operation of changing settings for image pickup, an operation of picking up an object image (target object image), and the like in accordance with the received control signal. Furthermore, the image pickup apparatus can output image data obtained by picking up the object image to the operation apparatus by wireless communication, thereby displaying the image data on the electronic apparatus.

For example, Jpn. Pat. Appln. KOKAI Publication No. 2006-270263 (to be referred to as patent literature 1 hereinafter) discloses the following technique. That is, a mobile phone transmits a shooting instruction signal containing unique ID information by infrared communication. A digital camera collates whether the ID information contained in the shooting instruction signal matches ID information registered in an ID registration unit. If collation result indicates that the pieces of ID information match each other, the digital camera controls respective units to generate still image data from an image pickup signal output from a CCD image sensor.

SUMMARY

According to one embodiment, an image pickup apparatus includes, an imaging element configured to generate image data by picking up a target object image based on a plurality of control items, a communication circuit configured to communicate with a first operation apparatus and a second operation apparatus, and a CPU configured to discriminate, among the plurality of control items, between a control item which accepts a change by a control signal transmitted from the first operation apparatus and a control item which accepts a change by a control signal transmitted from the second operation apparatus, and control the control item in accordance with the control signal transmitted from the operation apparatus corresponding to the control item.

According to the present invention, it is possible to provide an image pickup apparatus, operation apparatus, image pickup system, and image pickup method, in which a plurality of operation apparatuses can control one image pickup apparatus in cooperation with each other.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 4 is a view for explaining an example of a control application according to the first embodiment;

FIG. 5 is a view for explaining the example of the control application according to the first embodiment;

DETAILED DESCRIPTION

An image pickup apparatus, an operation apparatus, and an image pickup system according to an embodiment will be described in detail below with reference to the accompanying drawings. A method of acquiring an image which gives a strong impression to a viewer by adding various image effects within a screen to provide information of a target object, and a parameter change operation at the time of acquisition of the image will be mainly explained. However, instead of the image, an audio may be used. Any method of acquiring information which appeals to the five senses is applicable.

First Embodiment

Figure 1:
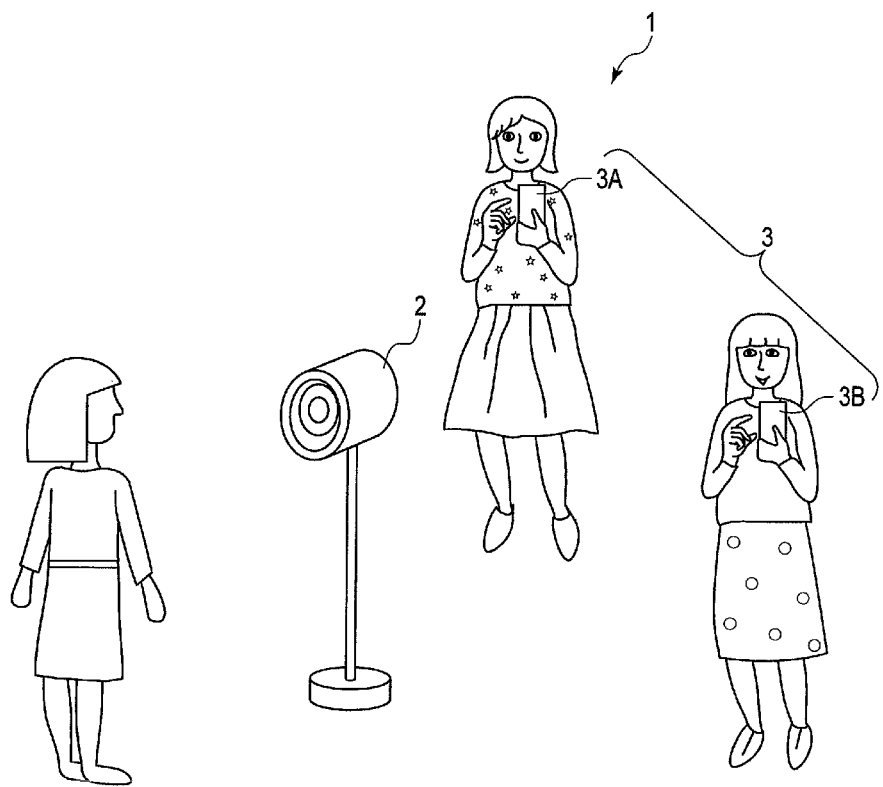
FIG. 1 is a view for explaining an example of an image pickup system according to the first embodiment.

FIG. 1 is a view for explaining an example of an image pickup system 1 according to the first embodiment. The image pickup system 1 includes an image pickup apparatus 2 and a plurality of operation apparatuses 3.

The image pickup apparatus 2 is a camera for acquiring image data by picking up an object image. The image pickup apparatus 2 can wirelessly communicate with, for example, a first smartphone (first operation apparatus) 3A and a second smartphone (second operation apparatus) 3B. For example, the image pickup apparatus 2, the first smartphone 3A, and the second smartphone 3B support a wireless LAN and Bluetooth®. The image pickup apparatus 2 wirelessly communicates with the first smartphone 3A and the second smartphone 3B using the wireless LAN or Bluetooth.

The image pickup apparatus 2 can perform, for example, broadcasting (or multicasting) for executing one-to-many communication and unicasting for executing one-to-one communication.

For example, the image pickup apparatus 2 can successively transmit, to the first smartphone 3A, the second smartphone 3B, and the like by broadcasting, image data acquired by picking up an object image at a predetermined period, thereby performing through image display for continuously displaying the image data on the first smartphone 3A and the second smartphone 3B as a plurality of targets.

Furthermore, for example, the image pickup apparatus 2 receives control signals transmitted from the first smartphone 3A and the second smartphone 3B by unicasting. In accordance with the control signals, the image pickup apparatus 2 performs, for example, an operation of changing image pickup parameters (control items) as various settings for image pickup, an operation (to be collectively referred to as an image pickup operation hereinafter) of picking up a still image or movie, an operation of transmitting image data, and the like.

Each operation apparatus 3 is an apparatus for controlling the image pickup apparatus 2. The operation apparatuses 3 are, for example, the first smartphone 3A and the second smartphone 3B. Each operation apparatus 3 includes a display panel for displaying an image, and an operation unit for accepting an operation input by the user. Each operation apparatus 3 generates a control signal for controlling the operation of the image pickup apparatus 2 based on the operation input by the user to the operation unit. Each operation apparatus 3 can transmit the generated control signal to the image pickup apparatus 2 by unicasting, thereby controlling the operation of the image pickup apparatus 2. Each operation apparatus 3 receives the image data transmitted from the image pickup apparatus 2 by broadcasting, and displays the received image data on the display panel. Note that in this example, a smartphone will be exemplified as the operation apparatus 3. However, the operation apparatus 3 may be, for example, a tablet PC, a notebook PC, watch-type information processing apparatus, or another terminal.

In the above-described image pickup system 1, when the operation apparatus 3 transmits a control signal (image pickup parameter change request) for changing the image pickup parameters to the image pickup apparatus 2, the image pickup parameters of the image pickup apparatus 2 can be controlled from each of the plurality of operation apparatuses 3 such as the first smartphone 3A and the second smartphone 3B. Furthermore, in the above-described image pickup system 1, when the operation apparatus 3 transmits, to the image pickup apparatus 2, a request to execute an image pickup operation, execution of the image pickup operation by the image pickup apparatus 2 can be instructed from each of the plurality of operation apparatuses 3 such as the first smartphone 3A and the second smartphone 3B.

Furthermore, the above-described image pickup apparatus 2 maintains a state in which it is always connectable to the operation apparatus 3 using a communication method (first communication method) of low power consumption such as Bluetooth Low Energy. Upon receiving a request (for example, a communication path establishment request) from the operation apparatus 3, the image pickup apparatus 2 sets a communication method (second communication method), which can perform high-speed communication such as a wireless LAN (for example, Wi-Fi®), in a state in which it is connectable to the operation apparatus 3. With this arrangement, the image pickup apparatus 2 receives various control signals from the operation apparatus 3 by unicast communication using the first communication method. When transmitting a large amount of data such as video signals of through images and image data to the operation apparatus 3, the image pickup apparatus 2 transmits the data by broadcast communication using the second communication method.

When an application (control application) for controlling the image pickup apparatus 2 is started, the operation apparatus 3 is set in a state in which it is connectable to the image pickup apparatus 2 by a communication method (first communication method) of low power consumption such as Bluetooth Low Energy. The operation apparatus 3 transmits a communication path establishment request to the image pickup apparatus 2. If the image pickup apparatus 2 allows the request, the operation apparatus 3 is set in a state in which it is connectable to the image pickup apparatus 2 by a communication method (second communication method) which can perform high-speed communication with the image pickup apparatus 2. With this arrangement, the operation apparatus 3 transmits various control signals to the image pickup apparatus 2 by unicast communication using the first communication method. Furthermore, when receiving, from the image pickup apparatus 2, a large amount of data such as video signals of through images and image data, the operation apparatus 3 receives the data by broadcast communication using the second communication method. This enables the image pickup apparatus 2 and the operation apparatus 3 to suppress power consumption and achieve high-speed communication.

The image pickup apparatus 2 will be described first.

Figure 2:
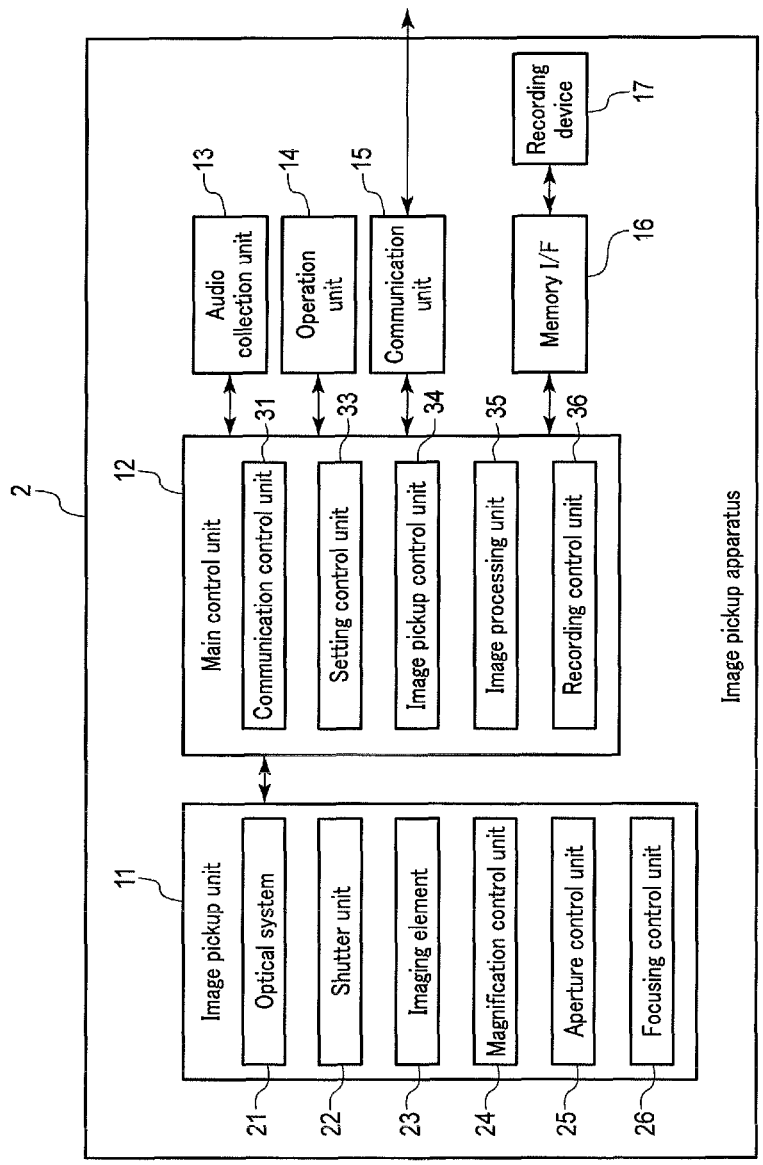
FIG. 2 is a block diagram for explaining an example of the arrangement of an image pickup apparatus according to the first embodiment.

FIG. 2 shows an example of the arrangement of the image pickup apparatus 2. The image pickup apparatus 2 is a camera mounted with a communication function. The image pickup apparatus 2 includes an image pickup unit 11, a main control unit 12, an audio collection unit 13, an operation unit 14, a communication unit 15, a memory I/F 16, and a recording device 17.

The image pickup unit 11 acquires image data by executing an image pickup operation. The image pickup unit 11 includes an optical system 21, a shutter unit 22, an imaging element 23, a magnification control unit 24, an aperture control unit 25, and a focusing control unit 26.

The optical system 21 forms an image of a light beam from an object on the imaging element 23. The optical system 21 includes a plurality of lenses. The optical system 21 includes, for example, a focus adjustment lens (focusing lens). The focusing lens is configured to be movable along the optical axis direction of the optical system 21. The focusing lens adjusts the focus of the optical system 21 by moving along the optical axis direction of the optical system 21. Furthermore, the optical system 21 includes, for example, a focal length adjustment lens (zoom lens). The zoom lens is configured to be movable along the optical axis direction of the optical system 21. The zoom lens adjusts the focal length of the optical system 21 by moving along the optical axis direction of the optical system 21. The optical system 21 also includes an aperture. The aperture is configured to be openable/closable to adjust the amount of a light beam entering the imaging element 23 via the optical system 21.

The shutter unit 22 adjusts an exposure time as a time during which light transmitted through the optical system 21 enters the imaging element 23. The shutter unit 22 is, for example, a focal plane shutter.

The imaging element 23 includes an imaging plane formed by arraying a plurality of imaging pixels for photoelectrically converting light and storing charges. The plurality of imaging pixels arrayed on the imaging plane generate image signals by performing image pickup processing of converting an object image formed via the optical system 21 into electrical signals according to a light amount. The imaging element 23 is formed by, for example, a CCD (Charge Coupled Devices) image sensor, a CMOS (Complementary Metal Oxide Semiconductor) image sensor, or another image sensor. Color filters are provided on a surface which light of the plurality of imaging pixels arrayed on the imaging plane enters. The imaging element 23 generates color image signals by the plurality of imaging pixels provided with color filters of different colors. The imaging element 23 may include, within the imaging plane, a plurality of focus detection pixels which are used for focus adjustment by a phase difference method.

The magnification control unit 24 controls the position of the zoom lens of the optical system 21. The magnification control unit 24 changes the focal length of the optical system 21 by changing the position of the zoom lens of the optical system 21 under the control of the main control unit 12.

The aperture control unit 25 controls the opening degree of the aperture of the optical system 21. The aperture control unit 25 changes the f-number of the optical system 21 by changing the opening degree of the aperture of the optical system 21 under the control of the main control unit 12.

The focusing control unit 26 controls the position of the focusing lens of the optical system 21. The focusing control unit 26 adjusts the focus of the optical system 21 by changing the position of the focusing lens of the optical system 21 under the control of the main control unit 12.

The main control unit 12 controls the operations of the respective units of the image pickup apparatus 2. The main control unit 12 includes, for example, a CPU and a memory. The main control unit 12 implements various functions when the CPU reads out programs stored in the memory and executes them. For example, the main control unit 12 determines an operation by the operation unit 14, controls communication by the communication unit 15, controls image pickup processing, and performs recording processing.

The audio collection unit 13 collects an audio. The audio collection unit 13 is, for example, a stereo microphone. The audio collection unit 13 acquires digital audio data by converting an audio into an analog electrical signal, and converting the electrical signal into a digital signal. The audio collection unit 13 inputs the acquired audio data to the main control unit 12.

The operation unit 14 includes a plurality of operation members used by the user to perform various operations of the image pickup apparatus 2. The operation members include, for example, various buttons such as a release button and power button.

The release button is a button for causing the image pickup apparatus 2 to execute image pickup processing. The operation unit 14 detects, for example, the operation of the release button by the user in two stages. More specifically, if the release button is pressed halfway, the operation unit 14 inputs, to the main control unit 12, an operation signal (first release signal) indicating that the first release operation has been performed. If the release button is pressed fully, the operation unit 14 inputs, to the main control unit 12, an operation signal (second release signal) indicating that the second release operation has been performed.

The communication unit 15 is a circuit for wirelessly communicating with the operation apparatus 3. The communication unit 15 is communicable with each of the operation apparatuses 3 such as the first smartphone 3A and the second smartphone 3B. The communication unit 15 receives a control signal from the operation apparatus 3, and supplies the received control signal to the main control unit 12. The communication unit 15 receives, from the main control unit 12, data to be transmitted to the operation apparatus 3, and transmits the received data to the operation apparatus 3. More specifically, the communication unit 15 communicates with the operation apparatus 3 by a communication method such as a wireless LAN (Wi-Fi) or Bluetooth. The communication unit 15 is represented by one block but may be formed from blocks or circuits of a plurality of communication methods. For example, the communication unit 15 functions as the access point (AP) of the wireless LAN, and thus can communicate with the operation apparatus 3 or the like by the wireless LAN. Furthermore, the communication unit 15 can perform communication by Bluetooth when paired with the operation apparatus 3. For example, the communication unit 15 may use the wireless LAN (Wi-Fi) to transmit/receive image data and use Bluetooth to transmit/receive a control signal and the like. The communication unit is formed from an antenna, a circuit for converting a signal into a radio wave by a specific protocol, and the like, and may thus translate into a communication circuit but may include a portion operated by a program.

In addition, for example, the communication unit 15 has a function of performing one-way communication (broadcast or multicast communication) capable of transmitting the same data to the plurality of operation apparatuses 3 at the same time, and a function of performing two-way communication (unicast communication) capable of transmitting/receiving data to/from one of the operation apparatuses 3. The communication unit 15 can simultaneously execute the function of performing one-way communication and the function of performing two-way communication. For example, the communication unit 15 is represented by one block but may be formed from blocks or circuits of a plurality of communication methods, and separately includes a communication unit for one-way communication and a communication unit for two-way communication. For example, the former may be formed by a wireless LAN and the latter may be formed by Bluetooth. The wireless LAN supports transmission of a large amount of data more often than Bluetooth. Thus, by transmitting obtained image signals by the wireless LAN, each of a plurality of remote apparatuses can confirm an image, and a signal (overall control signal) for controlling each remote apparatus can be easily included in the image signals. This prevents each apparatus or two-way communication between the apparatuses from being hindered. On the other hand, Bluetooth can decrease the current consumption, and thus allows a control command or the like to be communicated with low power consumption. That is, by effectively using these communication units, there can be provided an information acquisition apparatus including a first communication function unit (circuit) configured to perform one-way communication (first communication) capable of transmitting the same data to a plurality of operation apparatuses at the same time, and a second communication function unit (circuit) configured to perform two-way transmission/reception (second communication) of data to/from each of the plurality of operation apparatuses, characterized by comprising a communication control unit configured to perform, in the first communication, prior to the second communication, communication to help establishment of the second communication between one of the plurality of operation apparatuses and the information acquisition apparatus. The timing of the communication is not limited to the timing "prior to the second communication". When the apparatus focuses on the two-way communication, the communication may be interrupted by one-way communication and communication with another apparatus may be encouraged. The communication control unit of the information acquisition apparatus is characterized by performing, using the second communication function unit, communication for encouraging the information acquisition apparatus to perform auxiliary communication by the first communication function unit.

In one-way communication, the communication unit 15 transmits data without confirming whether the plurality of operation apparatuses 3 have normally received the transmitted data. Even if data transmitted from one of the plurality of operation apparatuses 3 could not be received normally, the communication unit 15 processes data transmitted from the operation apparatus 3 next without transmitting a retransmission request to the operation apparatus 3.

In two-way communication, the communication unit 15 transmits/receives data while confirming whether data transmitted/received to/from the operation apparatuses 3 have been received normally. With this arrangement, if the communication unit 15 receives, from the operation apparatus 3, a response indicating that data could not be received normally, it retransmits the data to the operation apparatus 3. If the communication unit 15 could not normally receive data transmitted from the operation apparatus 3, it transmits a retransmission request to the operation apparatus 3.

The memory I/F 16 includes a card slot into which the recording device 17 including a plurality of contact terminals can be inserted, and contact terminals which are electrically connected to the contact terminals of the recording device 17 when the recording device 17 is inserted into the card slot. The recording device 17 is, for example, a memory card. The memory I/F 16 relays input/output of data between the recording device 17 and the main control unit 12.

The main control unit 12 functions as, for example, a communication control unit 31, a setting control unit 33, an image pickup control unit 34, an image processing unit 35, a recording control unit 36, and the like.

The communication control unit 31 controls wireless communication with another operation apparatus 3 by the communication unit 15. The communication control unit 31 analyzes the control signal received by the communication unit 15 from the operation apparatus 3 such as the first smartphone 3A or the second smartphone 3B, thereby recognizing contents of a request from the operation apparatus 3 as a communication partner to the image pickup apparatus 2. The contents of the request from the operation apparatus 3 to the image pickup apparatus 2 indicate, for example, a request (communication path establishment request) to establish a communication path, a request (image pickup parameter change request) to change image pickup parameters, an image pickup operation execution request, and an image data transmission request. The mobile information terminal such as a smartphone operates the image pickup apparatus (information acquisition apparatus), and can thus translate into an operation apparatus.

The communication path establishment request is a signal for requesting, from the operation apparatus 3, the image pickup apparatus 2 to permit various requests such as the image pickup parameter change request, the image pickup operation execution request, and the image data transmission request. In response to the communication path establishment request, the communication control unit 31 transmits, to the operation apparatus 3, information necessary for the operation apparatus 3 to be connected to the image pickup apparatus 2. The information necessary for the operation apparatus 3 to be connected to the image pickup apparatus 2 is, for example, the SSID of the image pickup apparatus 2 functioning as the AP. If the image pickup apparatus 2 permits control of the operation apparatus 3 in the same network, a network ID can be used as information necessary for the operation apparatus 3 to be connected to the image pickup apparatus 2.

The image pickup parameter change request is a signal for requesting, from the operation apparatus 3, the image pickup apparatus 2 to issue a request to change the image pickup parameters such as a focal length, f-number, shutter speed, and ISO. Note that the image pickup parameter change request may be a signal for requesting to change further various image pickup parameters and various settings related to the operation of the image pickup apparatus 2.

The image pickup operation execution request is a signal for requesting, from the operation apparatus 3, the image pickup apparatus 2 to execute an image pickup operation. Note that the image pickup operation execution request is more specifically the same signal as the first release signal or the second release signal.

The image data transmission request is a signal for requesting, from the image pickup apparatus 2, the operation apparatus 3 to transmit image data recorded in the recording device 17 or image data acquired by the image pickup operation.

For example, the communication control unit 31 generates data to be transmitted to the operation apparatus 3, and transmits the data to the operation apparatus 3 using the communication unit 15. For example, the communication control unit 31 transmits, to the operation apparatus 3, a processing result corresponding to the communication path establishment request, a processing result corresponding to the image pickup parameter change request, image data, various control signals, and the like.

Note that the communication control unit 31 appropriately selects one of one-way communication and two-way communication as a means for transmitting information to the operation apparatus 3. For example, the communication control unit 31 selects one of one-way communication and two-way communication in accordance with the number of operation apparatuses as transmission destinations, the type of information to be transmitted, and the like.

For example, the communication control unit 31 transmits image data to the plurality of operation apparatuses at the same time by one-way communication. This enables the image pickup apparatus 2 to display the image data on the plurality of operation apparatuses at the same time.

In addition, for example, the communication control unit 31 transmits/receives a control signal for changing the image pickup parameters by two-way communication. This enables the image pickup apparatus 2 to reliably change the image pickup parameters in accordance with the image pickup parameter change request transmitted from the operation apparatus.

The setting control unit 33 stores and changes the image pickup parameters such as the focal length, f-number, shutter speed, and ISO, and the various settings related to the operation of the image pickup apparatus 2. The setting control unit 33 includes a memory for storing the image pickup parameters and the various settings related to the operation of the image pickup apparatus 2. In accordance with an operation input or the result of AE (Automatic Exposure) processing, the setting control unit 33 changes the image pickup parameters and the various settings related to the operation of the image pickup apparatus 2, which are stored in the memory. Furthermore, in accordance with the image pickup parameter change request acquired by the communication control unit 31, the setting control unit 33 changes the image pickup parameters on the memory. The setting control unit 33 generates a response including the image pickup parameters changed in accordance with the image pickup parameter change request, and transmits the generated response to the operation apparatus 3 which has transmitted the image pickup parameter change request. In addition, the setting control unit 33 may periodically transmit the current image pickup parameters to each operation apparatus 3.

When accepting the image pickup parameter change requests from the plurality of operation apparatuses 3, the plurality of contradictory image pickup parameter change requests may be received to cause a conflict. The plurality of contradictory image pickup parameter change requests are, for example, a plurality of image pickup parameter change requests indicating different f-numbers. In this case, the setting control unit 33 discriminates between an apparatus (operation enabling apparatus) from which the image pickup parameter change request is accepted and an apparatus (operation disabling apparatus) from which no image pickup parameter change request is accepted. The setting control unit 33 adds, to data to be transmitted by broadcast communication, an enabling/disabling signal containing information (for example, identification information such as a MAC address or IP address) indicating the operation apparatus serving as an operation enabling apparatus and information indicating the operation apparatus serving as an operation disabling apparatus. With this operation, the setting control unit 33 causes each operation apparatus 3 to recognize whether the image pickup parameter change request is enabled or disabled. The enabling/disabling signal is information indicating a control item which accepts a change by the control signal from the operation apparatus and a control item which does not accept a change by the control signal. The enabling/disabling signal may be, for example, information indicating, for each operation apparatus, a control item which accepts a change by the control signal and a control item which does not accept a change by the control signal, or information indicating, for each control item, an operation apparatus from which a change by the control signal is accepted and an operation apparatus from which a change by the control signal is not accepted. The operation apparatus (mobile information terminal) exemplified above can translate into an operation apparatus (image pickup control apparatus) including a first communication function unit (circuit) for acquiring data from an information acquisition apparatus (image pickup apparatus) by one-way communication (first communication) and a second communication function unit (circuit) capable of performing two-way transmission/reception (second communication) of data to/from the information acquisition apparatus, characterized by comprising a communication control unit configured to perform communication to help establishment of the second communication between the information acquisition apparatus and the operation apparatus (image pickup control apparatus).

The image pickup control unit 34 controls image pickup processing by the image pickup unit 11. For example, the image pickup control unit 34 reads out the image signals from the imaging element 23. The image pickup control unit 34 acquires digital image data by performing various signal processes for the readout image signals under the control of the main control unit 12.

For example, the image pickup control unit 34 controls the magnification control unit 24 so that the focal length of the optical system 21 becomes equal to the focal length of the image pickup parameters.

The image pickup control unit 34 performs AE processing, AF (Automatic Focus) processing, and the like in accordance with the acquired image data. For example, if the main control unit 12 recognizes that the first release signal has been input, it controls AE processing and AF processing.

For example, the image pickup control unit 34 calculates an AE evaluation value in accordance with the outputs of pixels included in a predetermined region (AE region) in the acquired image data. The image pickup control unit 34 performs, based on the AE evaluation value, AE processing of automatically calculating the image pickup parameters related to brightness, such as the f-number, shutter speed, and ISO. The image pickup control unit 34 supplies the calculated image pickup parameters to the setting control unit 33 as a result of the AE processing.

For example, the image pickup control unit 34 calculates an AF evaluation value in accordance with the outputs of pixels included in a predetermined region (AF region) in the acquired image data. The AF evaluation value may be calculated by a contrast method or a phase difference method. Based on the AF evaluation value, the image pickup control unit 34 calculates the position (focus position) of the focusing lens for adjusting the focus on an arbitrary object. The image pickup control unit 34 performs AF processing of adjusting the focus of the optical system 21 on an arbitrary object by supplying a control signal indicating the focus position to the focusing control unit 26 of the image pickup unit 11.

Each of the AE region and the AF region may be the entire region or a partial region of the image data. Each of the AE region and the AF region is arbitrarily set by the user or automatically set. For example, the AF region may be the same as the AE region.

If the image pickup control unit 34 recognizes that the second release signal has been input, it controls the image pickup operation. In this case; the image pickup control unit 34 controls the image pickup unit 11 to drive the aperture of the image pickup unit 11, drive the shutter unit 22, and execute exposure by the imaging element 23. That is, the image pickup control unit 34 controls the aperture control unit 25 so that the aperture of the optical system 21 has the f-number of the image pickup parameters. In addition, the image pickup control unit 34 controls the shutter unit 22 so that the shutter unit 22 operates at a timing according to the shutter speed of the image pickup parameters. For example, the image pickup control unit 34 controls the imaging element 23 so that sensitivity (the amplification degree of a signal) when reading out the image signals from the imaging element 23 becomes equal to sensitivity corresponding to the ISO of the image pickup parameters. This causes the image pickup control unit 34 to execute the image pickup operation by the image pickup unit 11 under the conditions corresponding to the image pickup parameters, thereby acquiring image data.

Furthermore, the image pickup control unit 34 controls acquisition, by the image pickup unit 11, of image data which can be displayed as through images. For example, the image pickup control unit 34 can acquire a plurality of temporally continuous image data by reading out signals generated by the imaging element 23 at a preset period.

The image processing unit 35 performs various image processes for the image data acquired by the image pickup control unit 34. For example, the image processing unit 35 performs, for the image data, various image processes such as color correction, gamma (γ) correction, contrast correction, monochrome/color mode processing, and through image processing. Furthermore, the image processing unit 35 performs image processing for the image data to acquire image data (for example, JPEG format or RAW format) for recording.

If the image processing unit 35 acquires a plurality of image data which can be displayed as through images, it generates video signals as a stream in accordance with the acquired image data. The image processing unit 35 transmits the video signals to the operation apparatuses 3 by the communication control unit 31 and the communication unit 15. Thus, the image pickup apparatus 2 causes the wirelessly connected operation apparatuses 3 such as the first smartphone 3A and the second smartphone 3B to perform through image display.

The recording control unit 36 records the image data in the recording device 17 connected to the memory I/F 16. The recording control unit 36 includes, for example, an intermediate buffer for temporarily recording the image data. The recording control unit 36 successively records, in the intermediate buffer, the image data acquired by the image pickup operation. The recording control unit 36 forms a file from the image data recorded in the intermediate buffer, and writes the file in the recording device 17 attached to the memory I/F 16.

The operation apparatus 3 will be described next.

Figure 3:
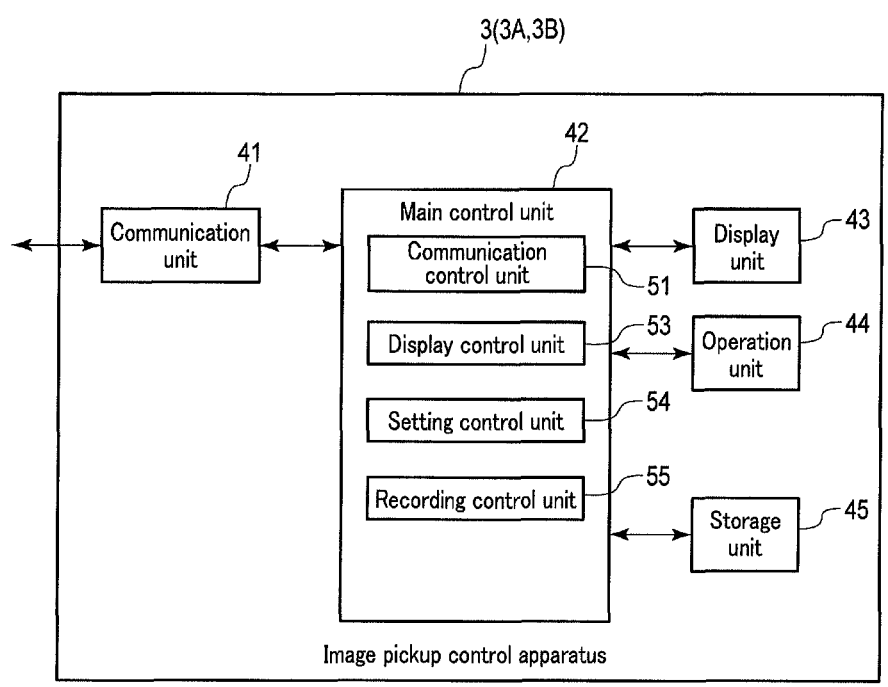
FIG. 3 is a block diagram for explaining an example of the arrangement of an operation apparatus according to the first embodiment.

FIG. 3 shows an example of the arrangement of the operation apparatus 3. The operation apparatus 3 is an information terminal having a communication function, such as the first smartphone 3A or the second smartphone 3B, as described above. The operation apparatus 3 includes a communication unit 41, a main control unit 42, a display unit 43, an operation unit 44, and a storage unit 45.

The communication unit 41 is a circuit for wirelessly communicating with the image pickup apparatus 2. The communication unit 41 is communicable with the image pickup apparatus 2. Under the control of the main control unit 42, the communication unit 41 transmits control signals for requesting to execute various operations to the image pickup apparatus 2. The communication unit 41 receives the data transmitted from the image pickup apparatus 2, and supplies the received data to the main control unit 42.

More specifically, the communication unit 41 communicates with the image pickup apparatus 2 by a communication method such as a wireless LAN or Bluetooth. For example, the communication unit 41 has a function of accessing the access point (AP) of the wireless LAN, and performs communication by the wireless LAN with the image pickup apparatus 2 and the like. The communication unit 41 is paired with the image pickup apparatus 2, thereby performing communication by Bluetooth. For example, the communication unit 41 may use the wireless LAN to transmit/receive image data and use Bluetooth to transmit/receive a control signal and the like.

In addition, for example, the communication unit 41 has a function of performing one-way communication with the image pickup apparatus 2 and a function of performing two-way communication with the image pickup apparatus 2. The communication unit 41 can simultaneously execute the function of performing one-way communication and the function of performing two-way communication. For example, the communication unit 41 separately includes a resonance unit for one-way communication and a resonance unit for two-way communication.

In one-way communication, if data is received, the communication unit 41 transmits, to the image pickup apparatus 2, no response indicating whether the data has been normally received. Even if the data transmitted from the image pickup apparatus 2 could not be received normally, the communication unit 41 processes data transmitted from the image pickup apparatus 2 next without transmitting a retransmission request to the image pickup apparatus 2.

In two-way communication, the communication unit 41 transmits/receives data while confirming whether data have normally been transmitted/received to/from the image pickup apparatus 2. With this arrangement, if the communication unit 41 receives, from the image pickup apparatus 2, a response indicating that the data could not be received normally, it retransmits the data to the image pickup apparatus 2. If the communication unit 41 could not receive the data from the image pickup apparatus 2 normally, it requests the image pickup apparatus 2 to retransmit the data. In two-way communication, the apparatus focuses on communication with a specific partner. Thus, it is necessary to cancel the state by appropriately generating an overall control signal in one-way communication.

The main control unit 42 controls the operations of the respective units of the operation apparatus 3. The main control unit 42 includes, for example, a CPU and a memory. The main control unit 42 implements various functions when the CPU reads out programs stored in the memory and executes them. For example, the main control unit 42 determines an operation by the operation unit 44, controls communication by the communication unit 41, controls display, and performs recording processing.

The display unit 43 displays a screen based on the video signals input from the main control unit 42. The display unit 43 includes a display device, and a driving circuit for causing the display device to display the screen based on the video signals. The display device of the display unit 43 is formed by, for example, a liquid crystal display or organic EL display.

The operation unit 44 includes a plurality of operation members used by the user to perform various operations of the operation apparatus 3. The operation members include, for example, a touch sensor and various buttons such as a power button. The operation unit 44 supplies an operation signal to the control unit based on the operation of the operation member. For example, the touch sensor is provided integrally with the display device of the display unit 43. The touch sensor supplies an operation signal to the control unit based on an operation on the screen displayed on the display device.

The storage unit 45 includes a recording device for recording various data. The storage unit 45 records, in the recording device, data supplied from the main control unit 42. The storage unit 45 stores, for example, an application (control application) for controlling the image pickup apparatus 2.

The CPU of the main control unit 42 executes the control application stored in the storage unit 45. Based on an operation by the operation unit 44 on the screen of the control application, the main control unit 42 generates a control signal for controlling the operation of the image pickup apparatus 2. For example, the main control unit 42 generates a control signal such as the above-described communication path establishment request, image pickup parameter change request, image pickup operation execution request, and image data transmission request based on the operation by the operation unit 44 on the screen of the control application. The main control unit 42 controls the operation of the image pickup apparatus 2 by transmitting the generated control signal to the image pickup apparatus 2. For example, the main control unit 42 functions as a communication control unit 51, a display control unit 53, a setting control unit 54, and a recording control unit 55.

The communication control unit 51 controls wireless communication with the image pickup apparatus 2 by the communication unit 41. For example, the communication control unit 51 transmits the control signal to the image pickup apparatus 2 by the communication unit 41. The communication control unit 51 analyzes, for example, the control signal received by the communication unit 41 from the image pickup apparatus 2, thereby recognizing data transmitted from the image pickup apparatus 2 as a communication partner. The communication control unit 51 also recognizes the image pickup parameters of the image pickup apparatus 2 and the various settings related to the operation of the image pickup apparatus 2 in accordance with information received from the image pickup apparatus 2. Note that the communication control unit 51 appropriately selects one of one-way communication and two-way communication as a means to be used to communicate with the image pickup apparatus 2. For example, the communication control unit 51 selects one of one-way communication and two-way communication in accordance with the type of information to be transmitted and the like.

The display control unit 53 controls the operation of the display unit 43. The display control unit 53 causes the display unit 43 to display necessary information or the like. For example, the display control unit 53 causes the display unit 43 to display various screens of the control application.

The setting control unit 54 changes and stores the image pickup parameters of the image pickup apparatus 2, such as the focal length, f-number, shutter speed, and ISO. Based on an operation by the operation unit 44 on the screen of the control application, the setting control unit 54 generates a control signal for controlling the operation of the image pickup apparatus 2. For example, the setting control unit 54 generates an image pickup parameter change request based on an operation by the operation unit 44 on the screen of the control application. The main control unit 42 changes the image pickup parameters of the image pickup apparatus 2 by transmitting the generated image pickup parameter change request to the image pickup apparatus 2. The setting control unit 54 includes a memory for storing the image pickup parameters of the image pickup apparatus 2 and the various settings related to the operation of the image pickup apparatus 2. In accordance with information (for example, a response to the image pickup parameter change request) received from the image pickup apparatus 2, the setting control unit 54 changes the image pickup parameters and the various settings related to the operation of the image pickup apparatus 2 on the memory. This allows the operation apparatus 3 to recognize the state of the various settings in the image pickup apparatus 2.

Furthermore, since the plurality of operation apparatuses 3 may transmit image pickup parameter change requests to the image pickup apparatus 2 at the same time, the setting control unit 54 recognizes, based on an enabling/disabling signal received from the image pickup apparatus 2, whether the self apparatus is an operation enabling apparatus or an operation disabling apparatus. If it is recognized that the operation in the self apparatus is disabled, the setting control unit 54 sets an operation inhibition flag in the self apparatus. While the operation inhibition flag is set, the setting control unit 54 displays, on the screen of the control application, information indicating that no operation for changing the image pickup parameters is accepted.

The recording control unit 55 controls processing of recording data in the storage unit 45. For example, the recording control unit 55 records, in the storage unit 45, the image data received from the image pickup apparatus 2.

The screen of the control application will be described next.

FIGS. 4 and 5 each show an example of the screen of the control application. FIG. 4 shows an example in which an aperture control screen for controlling the aperture of the optical system 21 is displayed on the first smartphone 3A. FIG. 5 shows an example in which a focus control screen for controlling the focus of the optical system 21 is displayed on the second smartphone 3B.

As shown in FIG. 4, the aperture control screen includes a through image display frame 62 and an icon (for example, a slider) 61 for changing the f-number. In response to a touch operation for the icon 61 on the aperture control screen, the main control unit 42 generates an image pickup parameter change request for requesting to change the f-number. The main control unit 42 changes the f-number of the image pickup parameters of the image pickup apparatus 2 by transmitting the generated image pickup parameter change request to the image pickup apparatus 2.

As shown in FIG. 5, the focus control screen includes the through image display frame 62 and an icon (for example, a slider) 63 for changing the focus (focus position). If the image pickup apparatus 2 is set to perform AF processing, the focus control screen may further include an icon indicating an AF region. In response to a touch operation for the icon 63 on the focus control screen, the main control unit 42 generates an image pickup parameter change request for requesting to change the focus position. The main control unit 42 changes the focus position of the image pickup parameters of the image pickup apparatus 2 by transmitting the generated image pickup parameter change request to the image pickup apparatus 2. Furthermore, the main control unit 42 may generate, in response to a touch operation on the through image on the focus control screen, an image pickup parameter change request for requesting to change the AF region. The main control unit 42 changes the AF region when the image pickup apparatus 2 executes the AF processing, by transmitting the generated image pickup parameter change request to the image pickup apparatus 2.

Note that when accepting image pickup parameter change requests from the plurality of operation apparatuses 3 at the same time, a plurality of contradictory image pickup parameter change requests may be received to cause a conflict. In this case, the image pickup apparatus 2 discriminates between the operation apparatus 3 from which the image pickup parameter change request is accepted and the operation apparatus 3 from which no image pickup parameter change request is accepted. Furthermore, the image pickup apparatus 2 notifies the operation apparatus 3, from which no image pickup parameter change request is accepted, of it. With this arrangement, the image pickup apparatus 2 can control to prevent a conflict between the image pickup parameter change requests received from the plurality of operation apparatuses 3.

Figure 6:
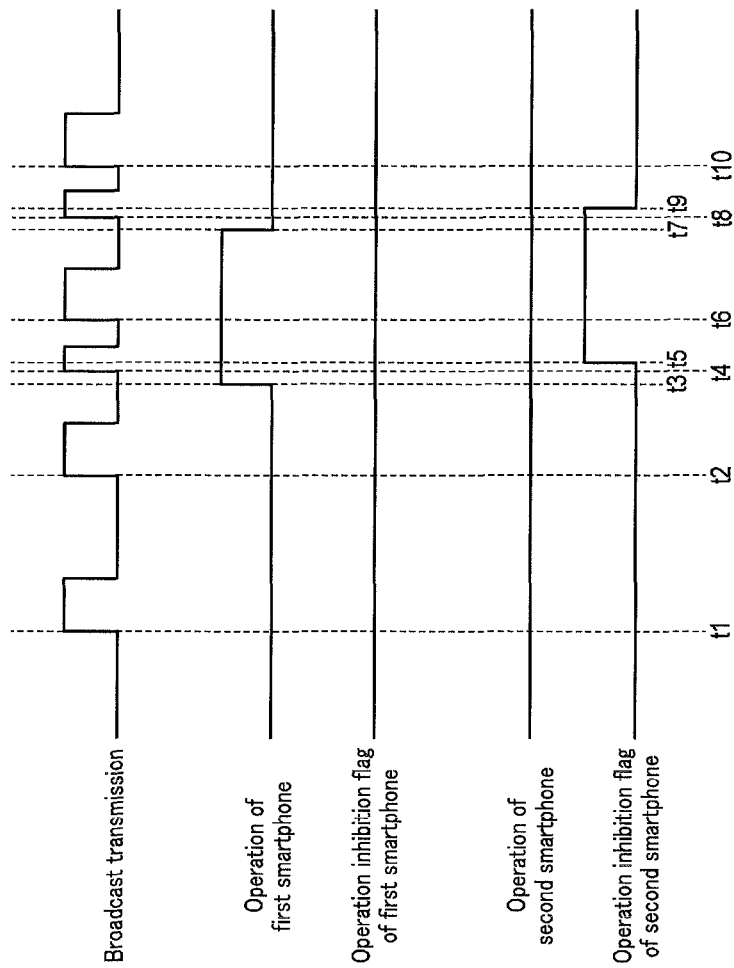
FIG. 6 is a timing chart for explaining the operations of the image pickup apparatus and the plurality of operation apparatuses, which are related to image pickup parameter change requests according to the first embodiment.

FIG. 6 is a timing chart for explaining the operations of the image pickup apparatus 2 and the plurality of operation apparatuses 3, which are related to the image pickup parameter change requests.

The main control unit 12 of the image pickup apparatus 2 acquires a through image at a given period, and transmits the through image as a video signal to the first smartphone 3A and the second smartphone 3B by broadcast communication. More specifically, the image pickup apparatus 2 transmits the through image at each of timings t1, t2, t6, and t10.

For example, assume that an operation for changing the image pickup parameters is performed for the first smartphone 3A during a period from timing t3 to timing t7. During this period, the first smartphone 3A transmits a parameter change request to the image pickup apparatus 2 by unicast communication.

By receiving the parameter change request, the image pickup apparatus 2 recognizes that the operation for changing the image pickup parameters has been performed for the first smartphone 3A. In this case, the image pickup apparatus 2 recognizes that the first smartphone 3A is an apparatus (operation enabling apparatus) from which the image pickup parameter change request is accepted, and recognizes that the second smartphone 3B as the other operation apparatus 3 is an apparatus (operation disabling apparatus) from which no image pickup parameter change request is accepted. That is, the image pickup apparatus 2 recognizes, an operation enabling apparatus, the operation apparatus 3 which has transmitted the image pickup parameter change request first while no image pickup parameter change request is received, and recognizes the other operation apparatus 3 as an operation disabling apparatus.

At timing t4, the image pickup apparatus 2 transmits, by broadcast communication, information (an enabling/disabling signal) indicating that the first smartphone 3A is an operation enabling apparatus from which the image pickup parameter change request is accepted and the second smartphone 3B is an operation disabling apparatus from which no image pickup parameter change request is accepted.

Upon receiving the enabling/disabling signal, each of the first smartphone 3A and the second smartphone 3B determines whether the self apparatus is an operation enabling apparatus or an operation disabling apparatus. In this example, since the first smartphone 3A is designated as an operation enabling apparatus, it recognizes that the operation is enabled. Furthermore, since the second smartphone 3B is designated as an operation disabling apparatus, it recognizes that the operation is disabled. For example, if it is recognized that the operation in the self apparatus is disabled, the second smartphone 3B sets an operation inhibition flag in itself at timing t5. While the operation inhibition flag is set, the second smartphone 3B displays, on the display unit 43 or the like, information indicating that no operation for changing the image pickup parameters is accepted.

If, for example, the operation for changing the image pickup parameters of the first smartphone 3A ends at timing t7, the first smartphone 3A ends transmission of the parameter change request to the image pickup apparatus 2.

If it is recognized that transmission of the parameter change request from the first smartphone 3A ends at timing t7, the image pickup apparatus 2 transmits, at timing t8, to each operation apparatus 3, an enabling/disabling signal indicating that all communicable apparatuses are set as operation enabling apparatuses. That is, if transmission of the parameter change request from the operation apparatus 3 ends, the image pickup apparatus 2 cancels designation of the operation disabling apparatus.

Upon receiving, at timing t8, the enabling/disabling signal indicating that the self apparatus is set as an operation enabling apparatus, the second smartphone 3B cancels its operation inhibition flag at timing t9.

Note that the above description assumes that the image pickup apparatus 2 transmits the enabling/disabling signal by broadcast communication at a timing different from a through image transmission timing. The present invention, however, is not limited to this. The image pickup apparatus 2 may transmit the enabling/disabling signal by broadcast communication in synchronism with through image transmission which is periodically performed. That is, the image pickup apparatus 2 may add the enabling/disabling signal to a packet in broadcast communication at the time of through image transmission.

In addition, the above description assumes that the image pickup apparatus 2 discriminates between an operation enabling apparatus and an operation disabling apparatus when receiving a parameter change request from one of the plurality of communicable operation apparatuses 3. The present invention, however, is not limited to this. The image pickup apparatus 2 may discriminate between an operation enabling apparatus and an operation disabling apparatus for each setting indicated by the image pickup parameter change request. That is, the image pickup apparatus 2 discriminates, for each control item, the one operation apparatus 3 as an operation enabling apparatus and the other operation apparatus 3 as an operation disabling apparatus. For example, if an image pickup parameter change request for requesting to change the f-number is received from the first smartphone 3A, the image pickup apparatus 2 may determine that the operation of the f-number by the first smartphone 3A is enabled, and determine that the operation of the f-number by the second smartphone 3B is disabled. At this time, the image pickup apparatus 2 determines that an operation for another image pickup parameter such as the shutter speed or ISO can be accepted from both the first smartphone 3A and the second smartphone 3B.

Moreover, the image pickup apparatus 2 may discriminate, for each set of a plurality of image pickup parameters, between an operation enabling apparatus and an operation disabling apparatus. For example, if a parameter change request for requesting to change the f-number is received from the first smartphone 3A, the image pickup apparatus 2 may determine that an image pickup parameter operation corresponding to a set including the f-number by the first smartphone 3A is enabled, and determine that an image pickup parameter operation corresponding to the set including the f-number by the second smartphone 3B is disabled.

The operations of the image pickup apparatus 2 and the plurality of operation apparatuses 3 corresponding to the timing chart of FIG. 6 will be described next.

Figure 7:
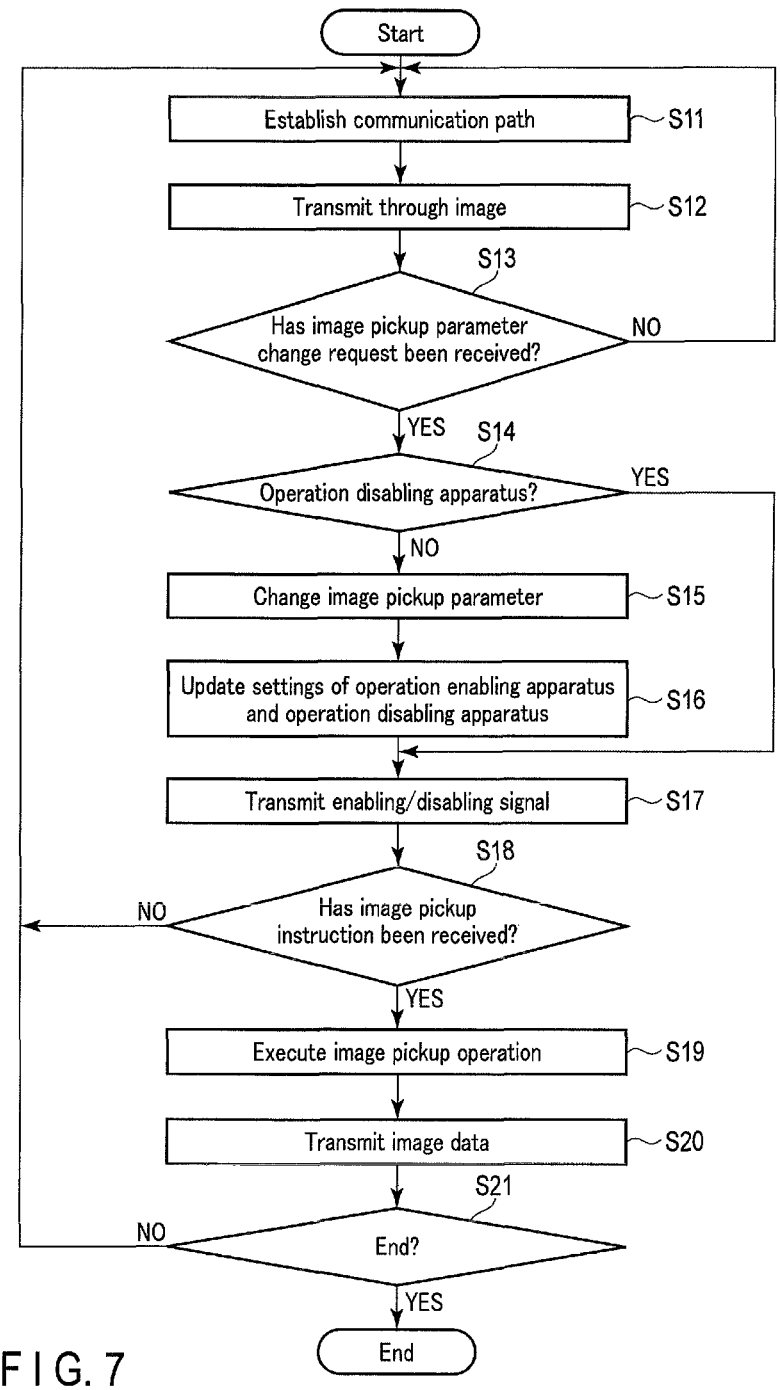
FIG. 7 is a flowchart for explaining the cooperative image pickup processing of the image pickup apparatus according to the first embodiment.

FIG. 7 is a flowchart for explaining the image pickup processing (cooperative image pickup processing) of the image pickup apparatus 2 under the control of the operation apparatus 3. Note that for the sake of descriptive simplicity, an image pickup parameter change request is a request to change a given image pickup parameter. However, the image pickup apparatus 2 may discriminate between an operation enabling apparatus and an operation disabling apparatus for each image pickup parameter.

The main control unit 12 of the image pickup apparatus 2 establishes a communication path with the operation apparatus 3 (step S11). For example, by making settings for communication with the operation apparatus 3 in response to the communication establishment request from the operation apparatus 3, the main control unit 12 is set in a state in which it is communicable with the operation apparatus 3. The main control unit 12 establishes a communication path with the operation apparatus 3 by, for example, the first communication method.

The main control unit 12 periodically transmits a through image to the operation apparatus 3 with which the communication path has been established (step S12). For example, the main control unit 12 transmits the through image to the operation apparatus 3 by the second communication method. The main control unit 12 transmits, by broadcast communication, the through image to the plurality of operation apparatuses 3 with which communication paths have been established. The main control unit 12 always stands by for reception of a signal transmitted from the operation apparatus 3 by unicast communication using the first communication method.

The main control unit 12 determines whether an image pickup parameter change request has been received (step S13). If it is determined that no image pickup parameter change request has been received (NO in step S13), the main control unit 12 returns to the processing in step S11. With this processing, in response to a communication path establishment request, a communication path with the new operation apparatus 3 is established, and a through image is transmitted to the operation apparatus 3.

If it is determined that an image pickup parameter change request has been received (YES in step S13), the main control unit 12 recognizes the operation apparatus 3 which has transmitted the image pickup parameter change request, and determines whether the operation apparatus 3 which has transmitted the image pickup parameter change request is an apparatus which has already been set as an operation disabling apparatus (step S14).

If it is determined that the operation apparatus 3 which has transmitted the image pickup parameter change request is an apparatus which has already been set as an operation disabling apparatus (YES in step S14), the main control unit 12 shifts to processing in step S17 without changing the settings of the operation enabling apparatus and operation disabling apparatus.

If it is determined that the operation apparatus 3 which has transmitted the image pickup parameter change request is not an apparatus which has already been set as an operation disabling apparatus, that is, the operation apparatus 3 is an apparatus set as an operation enabling apparatus (NO in step S14), the main control unit 12 changes the image pickup parameter in accordance with the received image pickup parameter change request (step S15). That is, the main control unit 12 determines whether the operation apparatus 3 which has transmitted the control signal is an operation disabling apparatus. If it is determined that the operation apparatus 3 which has transmitted the control signal is an operation disabling apparatus, the main control unit 12 executes no processing corresponding to the transmitted control signal. On the other hand, if it is determined that the operation apparatus 3 which has transmitted the control signal is an operation enabling apparatus, the main control unit 12 executes processing corresponding to the transmitted control signal.

Furthermore, the main control unit 12 updates the settings of the operation enabling apparatus and operation disabling apparatus (step S16). More specifically, the main control unit 12 sets, as an operation enabling apparatus, the operation apparatus 3 which has transmitted the image pickup parameter change request, and sets the other operation apparatus 3 as an operation disabling apparatus.

The main control unit 12 generates an enabling/disabling signal. The main control unit 12 generates an enabling/disabling signal in accordance with the settings of the operation enabling apparatus and operation disabling apparatus. The main control unit 12 generates an enabling/disabling signal indicating that the operation apparatus 3 which has transmitted the image pickup parameter change request is an operation enabling apparatus and the other operation apparatus 3 is an operation disabling apparatus: The main control unit 12 transmits the generated enabling/disabling signal (step S17). The communication unit 15 includes the function of performing one-way communication (broadcast or multicast communication) capable of transmitting the same data to the plurality of operation apparatuses 3 at the same time, and the function of performing two-way communication (unicast communication) capable of transmitting/receiving data to/from one of the operation apparatuses 3. In one-way communication (broadcast communication or multicast communication), it is possible to transmit the same signal to the plurality of apparatuses. Thus, one-way communication is used as communication not only for transmitting image signals but also for including a control signal in each control apparatus. The communication unit 15 may be able to simultaneously execute the function of performing one-way communication and the function of performing two-way communication. For example, the communication unit 15 may separately include a communication unit for one-way communication formed by Wi-Fi communication and a communication unit for two-way communication formed by Bluetooth. With this arrangement, while transmitting an image pickup result to the plurality of apparatuses at the same time, each apparatus may exchange dedicated information by proprietary two-way communication. In an application of switching communication in time series, only Wi-Fi or Bluetooth may be used to perform communication.

The main control unit 12 determines whether an instruction to execute an image pickup operation has been received (step S18). For example, the main control unit 12 determines whether the release button of the operation unit 14 has been operated to input the second release signal. Alternatively, for example, the main control unit 12 determines whether a request to execute an image pickup operation has been received from the operation apparatus 3.

If it is determined that no instruction to execute an image pickup operation has been received (NO in step S18), the main control unit 12 returns to the processing in step S11, and re-executes steps S11 to S17.

If it is determined that an instruction to execute an image pickup operation (YES in step S18), the main control unit 12 acquires image data by executing the image pickup operation by the image pickup unit 11 (step S19).

The main control unit 12 transmits the acquired image data to the operation apparatus 3 (step S20). For example, the main control unit 12 transmits the image data to the plurality of operation apparatuses 3 by broadcast communication using the second communication method. Alternatively, the main control unit 12 may transmit, by unicast communication using the second communication method, the image data to the operation apparatus 3 which has transmitted the request to execute the image pickup operation.

The main control unit 12 determines whether to end the cooperative image pickup processing (step S21). For example, if the power button is operated, or another image pickup processing is selected in mode selection, it is determined to end the cooperative image pickup processing.

If it is determined not to end the cooperative image pickup processing (NO in step S21), the main control unit 12 returns to the processing in step S11; otherwise (YES in step S21), the main control unit 12 ends the cooperative image pickup processing shown in FIG. 7.

Note that when transmitting the through image to the operation apparatus 3 by broadcast communication in step S12, the main control unit 12 may transmit the through image by adding an enabling/disabling signal to it.

Figure 8:
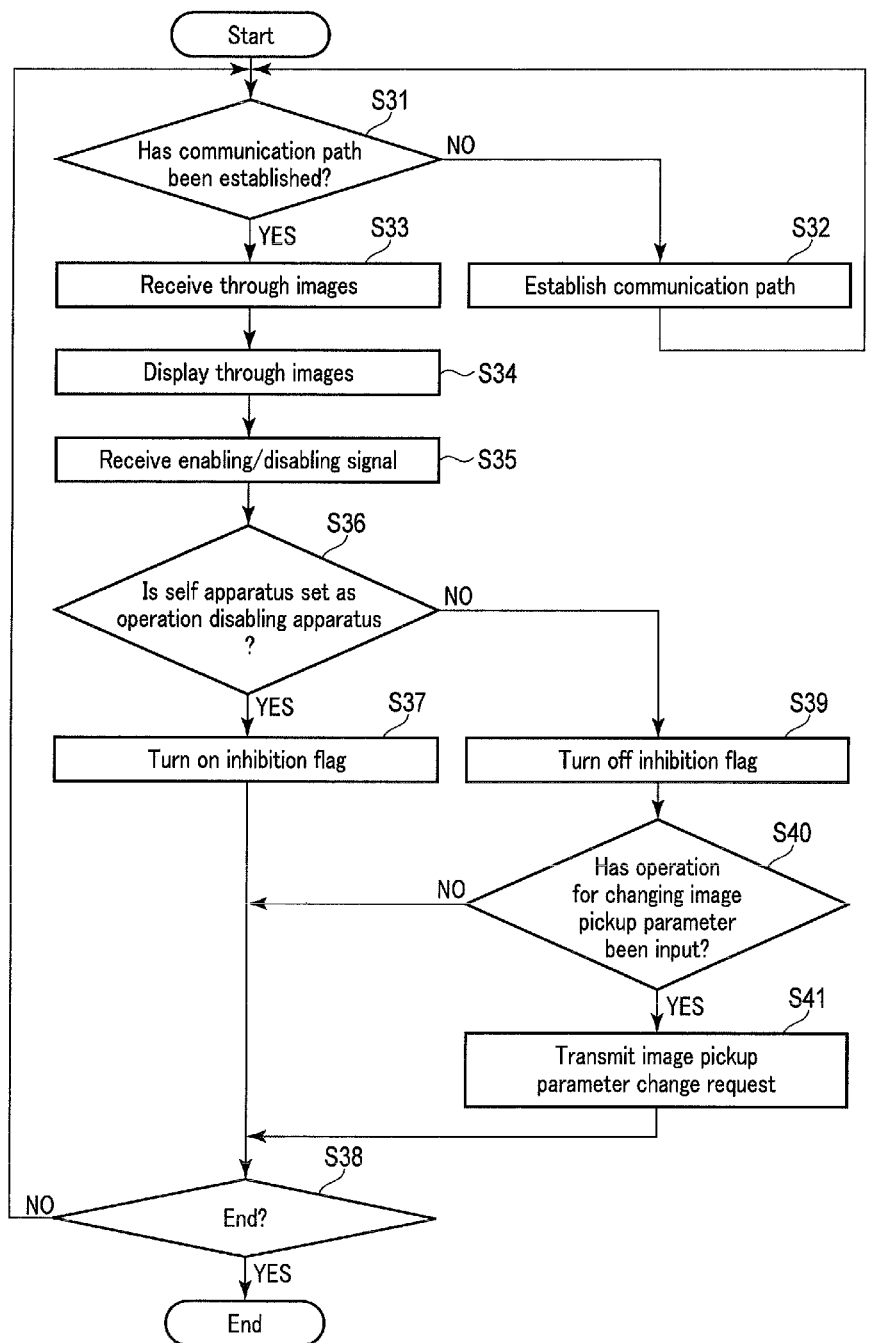
FIG. 8 is a flowchart for explaining cooperative image pickup control of the operation apparatus according to the first embodiment.

FIG. 8 is a flowchart for explaining the processing (cooperative image pickup control) of the operation apparatus 3 for causing the image pickup apparatus 2 to perform the cooperative image pickup processing. If the control application is executed, the operation apparatus 3 performs the cooperative image pickup control shown in FIG. 8. Note that for the sake of descriptive simplicity, an image pickup parameter change request is a request to change a given image pickup parameter. However, the image pickup apparatus 2 may discriminate between an operation enabling apparatus and an operation disabling apparatus for each image pickup parameter.

The main control unit 42 of the operation apparatus 3 determines whether a communication path with the image pickup apparatus 2 to be controlled has been established (step S31).

If it is determined that no communication path with the image pickup apparatus 2 to be controlled has been established (NO in step S31), the main control unit 42 transmits a communication path establishment request to the image pickup apparatus 2 by the first communication unit (step S32), and returns to the processing in step S31. The main control unit 42 may automatically transmit a communication path establishment request to the image pickup apparatus 2 or transmit a communication path establishment request to the image pickup apparatus 2 in response to an operation. If a communication path with the image pickup apparatus 2 to be controlled is established, the main control unit 42 sets the self apparatus in a state in which it can perform broadcast communication and unicast communication by the second communication method.

The main control unit 42 receives, by the second communication method, the through images transmitted from the image pickup apparatus 2 (step S33). The main control unit 42 performs through image display based on the through images acquired by the image pickup apparatus 2 by successively displaying the received through images on the display unit 43 (step S34). With this processing, the operation apparatus 3 can allow the user of the operation apparatus 3 to visually perceive the image data acquired by the image pickup apparatus 2.

The main control unit 42 receives the enabling/disabling signal transmitted from the image pickup apparatus 2 (step S35). Note that the main control unit 42 may receive the enabling/disabling signal at any timing. For example, the main control unit 42 may acquire, at a given timing, the enabling/disabling signal added to the packet transmitted from the image pickup apparatus 2 in broadcast communication.

Based on the enabling/disabling signal, the main control unit 42 determines whether the self apparatus is set as an operation disabling apparatus in the image pickup apparatus 2 (step S36).

If it is determined that the self apparatus is set as an operation disabling apparatus (YES in step S36), the main control unit 42 sets an operation inhibition flag in the self apparatus (step S37). While the operation inhibition flag is set, the main control unit 42 may display, on the display unit 43 or the like, information indicating that no operation for changing the image pickup parameter is accepted.

The main control unit 42 determines whether to end the cooperative image pickup control (step S38). For example, if an operation of ending the control application is input, it is determined to end the cooperative image pickup control.

If it is determined not to end the cooperative image pickup control (NO in step S38), the main control unit 42 returns to the processing in step S31; otherwise (YES in step S38), the main control unit 42 ends the cooperative image pickup control shown in FIG. 8.

If it is determined in step S36 that the self apparatus is not set as an operation disabling apparatus, that is, the self apparatus is set as an operation enabling apparatus (NO in step S36), the main control unit 42 cancels the operation inhibition flag of the self apparatus (step S39). Note that if no operation inhibition flag is originally set, the main control unit 42 need not particularly perform processing.

If no operation inhibition flag is set, the main control unit 42 determines whether an operation for changing the image pickup parameter has been input (step S40). If it is determined that no operation for changing the image pickup parameter has been input (NO in step S40), the main control unit 42 shifts to the processing in step S38.

If it is determined that an operation for changing the image pickup parameter has been input (YES in step S40), the main control unit 42 generates an image pickup parameter change request to change the image pickup parameter corresponding to the input operation, and transmits it to the image pickup apparatus 2 (step S41), thereby shifting to the processing in step S38. The main control unit 42 transmits, to the image pickup apparatus 2, the image pickup parameter change request by unicast communication using, for example, the first communication method.

According to the above-described embodiment, the image pickup apparatus 2 is configured to perform various operations in accordance with control signals transmitted from the connected operation apparatus 3 by wireless communication. That is, the image pickup apparatus 2 can be operated from the operation apparatus 3. The image pickup apparatus 2 discriminates between a control item which accepts a change by a control signal transmitted from a given operation apparatus 3 (first operation apparatus) and a control item which accepts a change by a control signal transmitted from another operation apparatus 3 (second operation apparatus) among the plurality of control items. That is, while one of the plurality of operation apparatuses 3 performs an operation, the image pickup apparatus 2 discriminates between an operation enabling apparatus from which a control signal is accepted and an operation disabling apparatus from which no control signal is accepted.

The image pickup apparatus 2 changes the control item in accordance with the control signal corresponding to the control item, which has been transmitted from the operation apparatus 3. That is, the image pickup apparatus 2 is configured to execute processing corresponding to the control signal transmitted from the operation apparatus 3 as an operation enabling apparatus and not to execute processing corresponding to the control signal transmitted from the operation apparatus 3 as an operation disabling apparatus. This allows the image pickup apparatus 2 to prevent a conflict of control from occurring when the plurality of operation apparatuses 3 perform a plurality of contradictory operations.

The control signal according to the above-described embodiment is an image pickup parameter change request serving as, for example, a control signal for changing the image pickup parameter in the image pickup apparatus 2. If an image pickup parameter change request is input from one of the plurality of operation apparatuses 3, the image pickup apparatus 2 accepts no image pickup parameter change request from the other operation apparatus 3. With this arrangement, the image pickup apparatus 2 can prevent a conflict of control from occurring when the plurality of operation apparatuses 3 input contradictory image pickup parameter change requests. Note that the control signal may be a signal for requesting to execute an image pickup operation or a signal for requesting to reproduce image data.

The image pickup apparatus 2 may determine, for each image pickup parameter, whether to accept an image pickup parameter change request from the operation apparatus 3. For example, if an image pickup parameter change request for changing the f-number is input from the given operation apparatus 3, the image pickup apparatus 2 may be configured not to accept a change of the f-number from the other operation apparatus 3 and to accept a request to change an image pickup parameter except for the f-number. With this arrangement, it is possible to simultaneously control the plurality of image pickup parameters of the image pickup apparatus 2 from the plurality of operation apparatuses 3.

The image pickup apparatus 2 includes the first communication method of low power consumption and the second communication method capable of performing high-speed communication, and acquires a control signal from the operation apparatus 3 by the first communication method, and transmits, to the operation apparatus 3, a large amount of data such as video signals of through images and image data by the second communication method. Thus, the image pickup apparatus 2 can suppress the power consumption and also achieve high-speed communication.

According to the above-described embodiment, the image pickup apparatus 2 transmits, to each operation apparatus 3, by broadcast communication, information indicating an operation enabling apparatus serving as the operation apparatus 3 from which a control signal is accepted and an operation disabling apparatus serving as the operation apparatus 3 from which no control signal is accepted. This allows the plurality of operation apparatuses 3 to cooperate with each other without causing mismatching or a lag between them, thereby recognizing whether the self apparatus is an operation enabling apparatus or an operation disabling apparatus.

Note that the image pickup apparatus 2 recognizes, as an operation enabling apparatus, the operation apparatus 3 which has transmitted a control signal first while no control signal is received from any operation apparatus 3, and recognizes the other operation apparatus 3 as an operation disabling apparatuses. The present invention, however, is not limited to this. Priority levels may be preset among the plurality of operation apparatuses 3. For example, if, while receiving a control signal from the given operation apparatus 3, the image pickup apparatus 2 receives a control signal transmitted from the other operation apparatus 3, the image pickup apparatus 2 may compare the priority levels of the two operation apparatuses 3 with each other, recognize, as an operation enabling apparatus, the operation apparatus 3 having the higher priority level, and recognize, as an operation disabling apparatus, the operation apparatus 3 having the lower priority level. Note that the image pickup apparatus 2 may include table data for recognizing the priority level of each operation apparatus 3, or each operation apparatus 3 may transmit, to the image pickup apparatus 2, information indicating the priority level of itself together with a control signal.

The above-described embodiment has explained the arrangement in which the image pickup apparatus 2 determines whether each of the plurality of operation apparatuses 3 is an operation enabling apparatus or an operation disabling apparatus. The present invention, however, is not limited to this. An arrangement in which the plurality of operation apparatuses 3 communicate with each other to determine the operation apparatus 3 operating as an operation enabling apparatus and the operation apparatus 3 operating as an operation disabling apparatus may be adopted.

The above-described embodiment has explained the arrangement in which the image pickup apparatus 2 and each operation apparatus 3 use the first communication method to transmit/receive a control signal and use the second communication method to transmit/receive image data. The present invention, however, is not limited to this. An arrangement in which the image pickup apparatus 2 and each operation apparatus 3 use the first or second communication method to transmit/receive a control signal and image data may be adopted.

The above-described embodiment has explained the arrangement in which the image pickup apparatus 2 and each operation apparatus 3 use unicast communication to transmit/receive a control signal, and use broadcast communication to transmit/receive image data. The present invention, however, is not limited to this. An arrangement in which the image pickup apparatus 2 and each operation apparatus 3 use either broadcast communication or unicast communication to transmit/receive a control signal and image data may be adopted.

Second Embodiment

Figure 9:
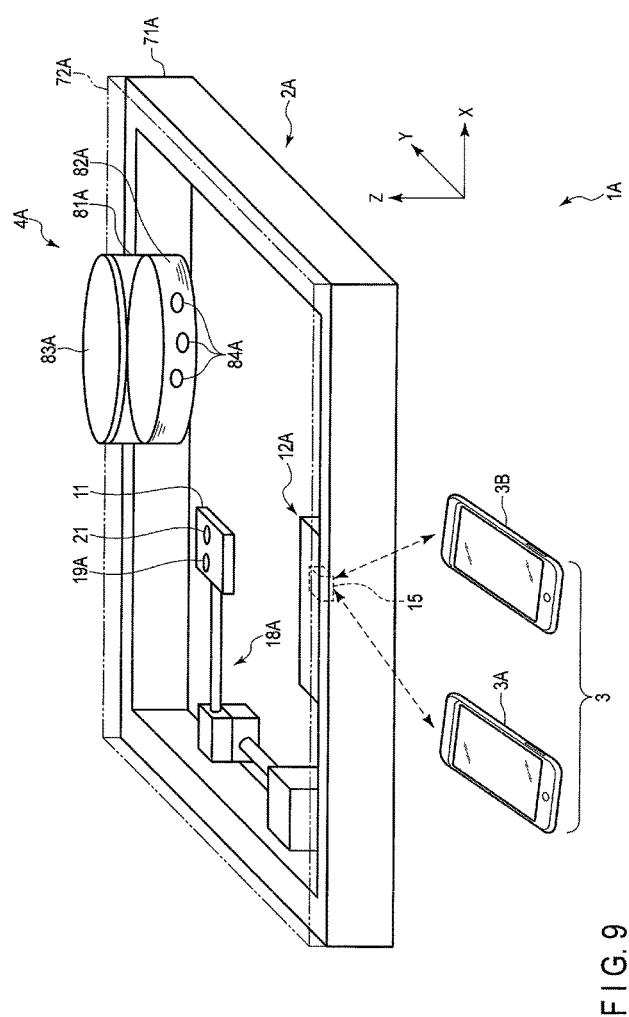
FIG. 9 is a view for explaining an example of an image pickup system according to the second embodiment.
Figure 10:
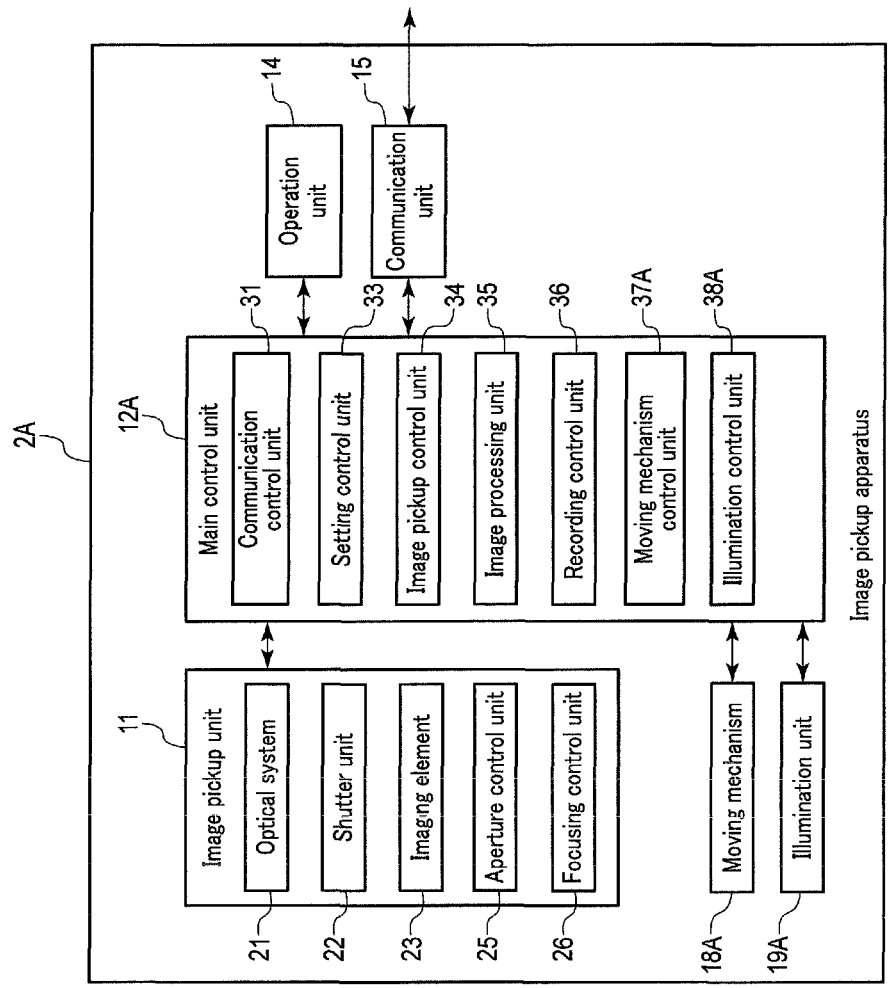
FIG. 10 is a block diagram for explaining an example of the arrangement of an image pickup apparatus according to the second embodiment.

FIG. 9 is a view showing an example of an image pickup system 1A according to the second embodiment. FIG. 10 shows an example of the arrangement of an image pickup apparatus 2A. The image pickup system 1A is a system for shooting an observation target such as a cell, a cell group, or tissue being cultured, and recording various kinds of information about the observation target. The image pickup system 1A includes the image pickup apparatus 2A, a plurality of operation apparatuses 3, and an observation target 4A. Note that the same reference numerals as those in the first embodiment denote the same components and a detailed description thereof will be omitted. If such highly specialized apparatus is used, specialization is required to perform various operations, there is a particular operation unique to the user, and thus improvement of the degree of freedom at the time of an operation is an essential theme.

The observation target 4A includes a container 81A, a culture medium 82A, and a reflecting plate 83A.

The container 81A is a transparent container such as a dish, culture flask, or multi-well plate. The container 81A is, for example, a culture container for culturing a biological sample. The shape, size, and the like of the container 81A are not limited.

The culture medium 82A is a culture medium for culturing a biological sample. The culture medium 82A may be a liquid medium or solid medium. The culture medium 82A is put in the container 81A.

The reflecting plate 83A is a member which reflects light. The reflecting plate 83A reflects light from an illumination unit 19A (to be described later).

The observation target 4A includes an organism cultured in the culture medium 82A in the container 81A or a biological sample as a sample derived from an organism. Cells 84A are included. The cells 84A may be adherent cells or floating cells. The cells 84A may be spheroids or tissue. Furthermore, the cells 84A may be derived from any organism, and may be bacteria or the like.

The image pickup apparatus 2A is a camera for acquiring various kinds of information of the observation target 4A by picking up the observation target 4A. The image pickup apparatus 2A shoots the cells 84A of the observation target 4A by, for example, picking up the observation target 4A while moving an image pickup unit 11, and records the number of cells 84A or cell groups, their forms, and the like.

The image pickup apparatus 2A includes a housing 71A and a transparent plate 72A. The housing 71A is a body which contains the respective units of the image pickup apparatus 2A. The housing 71A includes an opening. The transparent plate 72A is a transparent member which covers the opening of the housing 71A of the image pickup apparatus 2A. The transparent plate 72A includes an arrangement surface on which the observation target 4A is arranged.

The image pickup apparatus 2A includes the image pickup unit 11, a main control unit 12A, a communication unit 15, a moving mechanism 18A, and the illumination unit 19A, all of which are provided in the housing 71A. The image pickup apparatus 2A may also include an operation unit 14, a memory I/F 16, and a recording device 17.

The image pickup unit 11 picks up the observation target 4A arranged on the transparent plate 72A. The image pickup unit 11 includes an optical system 21, a shutter unit 22, an imaging element 23, an aperture control unit 25, and a focusing control unit 26. The optical system 21 of the image pickup unit 11 is arranged so that, for example, an optical axis is orthogonal to the arrangement surface of the transparent plate 72A.

The main control unit 12A controls the operations of the respective units of the image pickup apparatus 2A. The main control unit 12A includes, for example, a CPU and a memory. The main control unit 12A implements various functions when the CPU reads out programs stored in the memory and executes them. For example, the main control unit 12A controls communication by the communication unit 15, controls image pickup processing by the image pickup unit 11, controls alignment by the moving mechanism 18A, controls lighting by the illumination unit 19A, and performs recording processing.

The moving mechanism 18A moves the image pickup unit 11 under the control of the main control unit 12A, thereby determining the position of the center (field angle center) of the field angle of an image picked up by the image pickup unit 11. For example, the moving mechanism 18A moves the image pickup unit 11 in the first direction parallel to the arrangement surface of the transparent plate 72A and the second direction parallel to the arrangement surface of the transparent plate 72A and orthogonal to the first direction, thereby adjusting the position of the field angle center within a plane parallel to the arrangement surface of the transparent plate 72A.

The illumination unit 19A emits light in accordance with the field angle of the image pickup unit 11. The illumination unit 19A switches between an ON state and an OFF state under the control of the main control unit 12A. The illumination unit 19A is provided in, for example, a head forming the image pickup unit 11. With this arrangement, the illumination unit 19A moves together with the image pickup unit 11 by the moving mechanism 18A.

The main control unit 12A functions as, for example, a communication control unit 31, a setting control unit 33, an image pickup control unit 34, an image processing unit 35, a recording control unit 36, a moving mechanism control unit 37A, and an illumination control unit 38A.

If a control signal (moving request) for requesting to move the image pickup unit 11 is input from the operation apparatus 3, the moving mechanism control unit 37A moves the image pickup unit 11 by driving the moving mechanism 18A. The moving mechanism control unit 37A moves the image pickup unit 11 to pick up the overall container 81A.

If a control signal for requesting to execute an image pickup operation by the image pickup unit 11 is input from the operation apparatus 3, the illumination control unit 38A turns on the illumination unit 19A. This causes the illumination control unit 38A emits light in accordance with the field angle of the image pickup unit 11 at the time of execution of the image pickup operation. In addition, if a control signal (lighting request) for requesting to turn on the illumination unit 19A is input from the operation apparatus 3, the illumination control unit 38A may turn on the illumination unit 19A.

The image pickup apparatus 2A can wirelessly communicate with, for example, a first smartphone 3A and a second smartphone 3B. For example, the image pickup apparatus 2A supports a wireless LAN and Bluetooth®. The image pickup apparatus 2A wirelessly communicates with the first smartphone 3A and the second smartphone 3B using the wireless LAN or Bluetooth.

The image pickup apparatus 2A can perform broadcasting (or multicasting) for executing one-to-many communication and unicasting for executing one-to-one communication.

For example, the image pickup apparatus 2A can successively transmit, to the first smartphone 3A, the second smartphone 3B, and the like by broadcasting, image data acquired by picking up an object image at a predetermined period, thereby performing through image display for continuously displaying the image data on the first smartphone 3A and the second smartphone 3B as a plurality of targets.

Furthermore, for example, the image pickup apparatus 2A receives a control signal transmitted from each of the first smartphone 3A and the second smartphone 3B by unicasting. In accordance with the received control signal, the image pickup apparatus 2A performs, for example, an operation of changing image pickup parameters as various settings for image pickup processing, an operation (to be collectively referred to as an image pickup operation hereinafter) of picking up a still image or movie, an operation of transmitting image data, an operation of moving the image pickup unit 11, an operation of turning on the illumination unit 19A, and the like.

In the above-described image pickup system 1A, the operation apparatus 3 transmits, to the image pickup apparatus 2A, a control signal such as a control signal (image pickup parameter change request) for changing an image pickup parameter, a control signal (moving request) for requesting to move the image pickup unit 11, or a request to execute an image pickup operation. The image pickup apparatus 2A records various kinds of information about the observation target 4A by executing an operation in accordance with the received control signal.

Note that the image pickup apparatus 2A maintains a state in which it is always connectable to the operation apparatus 3 using, for example, a communication method (first communication method) of low power consumption such as Bluetooth Low Energy. Upon receiving a control signal from the operation apparatus 3, the image pickup apparatus 2A is set in a state in which it is connectable to the operation apparatus 3 using a communication method (second communication method) capable of performing high-speed communication such as a wireless LAN. With this arrangement, the image pickup apparatus 2A receives a communication path establishment request, an image pickup parameter change request, an image pickup operation execution request, a moving request, and the like from the operation apparatus 3 using the first communication method. When transmitting a large amount of data such as video signals of through images and image data to the operation apparatus 3, the image pickup apparatus 2A transmits the data using the second communication method. Cell culture or the like generally needs to be observed for a long period from several days to several months. However, in this arrangement, the image pickup apparatus 2A uses the second communication method, as needed, thereby making it possible to suppress the power consumption.

With the above arrangement, the image pickup apparatus 2A can acquire an image of the cells 84A formed in the observation target 4A without moving the observation target 4A. The image pickup apparatus 2A can count the number of cells 84A by performing image processing for the acquired image data.

Note that the moving mechanism control unit 37A is configured not to accept, if a moving request is received from one of the plurality of operation apparatuses 3, a moving request from the other operation apparatus 3. That is, the moving mechanism control unit 37A recognizes, as an operation enabling apparatus, the operation apparatus 3 which has transmitted a moving request first while no moving request is received from any operation apparatus 3, and recognizes the other operation apparatus 3 as an operation disabling apparatus. This enables the image pickup apparatus 2A to prevent a conflict of control from occurring when the plurality of operation apparatuses 3 input a plurality of contradictory moving requests. To suppress a conflict between operations and obtain better cooperation, there can be provided an information acquisition apparatus (cell observation apparatus) including a first communication function unit (circuit) configured to perform one-way communication (first communication) capable of transmitting the same data to a plurality of operation apparatuses at the same time, and a second communication function unit (circuit) configured to perform two-way transmission/reception (second communication) of data to/from each of the plurality of operation apparatuses, characterized by comprising a communication control unit configured to perform, in the first communication, prior to the second communication, communication to help establishment of the second communication between one of the plurality of operation apparatuses and the information acquisition apparatus. When viewed from the operating apparatus side, there can be provided an operation apparatus including a first communication function unit (circuit) configured to acquire data from the information acquisition apparatus by one-way communication (first communication), and a second communication function unit (circuit) capable of performing two-way transmission/reception (second communication) of data to/from the information acquisition apparatus, characterized by comprising a communication control unit configured to perform, in accordance with the first communication, communication to help establishment of the second communication between the information acquisition apparatus and the operation apparatus.

Furthermore, the moving mechanism control unit 37A may determine, for each direction of the moving mechanism 18A, whether to accept a moving request from the operation apparatus 3. If, for example, a moving request to move the image pickup unit 11 in the X direction is input from the given operation apparatus 3, the image pickup apparatus 2A may accept, from the other operation apparatus 3, not a moving request to move the image pickup unit 11 in the X direction but a moving request to move the image pickup unit 11 in the Y direction.

In the above description, the moving mechanism control unit 37A recognizes, as an operation enabling apparatus, the operation apparatus 3 which has transmitted a moving request first while no moving request is received from any operation apparatus 3, and recognizes the other operation apparatus 3 as an operation disabling apparatus. The present invention, however, is not limited to this. Priority levels may be preset among the plurality of operation apparatuses 3. For example, if, while receiving a moving request from the given operation apparatus 3, the image pickup apparatus 2A receives a moving request transmitted from the other operation apparatus 3, the image pickup apparatus 2A may compare the priority levels of the two operation apparatuses 3 with each other, recognize, as an operation enabling apparatus, the operation apparatus 3 having the higher priority level, and recognize, as an operation disabling apparatus, the operation apparatus 3 having the lower priority level. Note that the image pickup apparatus 2A may include table data for recognizing the priority level of each operation apparatus 3, or each operation apparatus 3 may transmit, to the image pickup apparatus 2A, information indicating the priority level of itself together with a control signal. As described above, this embodiment is characterized by an image pickup apparatus comprising an image pickup unit configured to generate image data by picking up a target object image such as cells, a communication unit configured to communicate with a plurality of operation apparatuses, and a control unit configured to discriminate, among function units forming the image pickup unit, between an operation enabling function unit which accepts a control signal transmitted from one of the plurality of operation apparatuses and an operation enabling function unit which accepts a control signal from the other one of the plurality of operation apparatuses, and control the image pickup unit in accordance with the control signal transmitted from the operation apparatus corresponding to the operation enabling function unit.

With respect to "discrimination", instead of determining, by the image pickup apparatus 2A, whether each of the plurality of operation apparatuses 3 is an operation enabling apparatus or an operation disabling apparatus, the plurality of operation apparatuses 3 may perform determination by communicating with each other.

The image pickup apparatus 2A includes the first communication method of low power consumption and the second communication method capable of performing high-speed communication, and acquires a control signal from the operation apparatus 3 by the first communication method, and transmits, to the operation apparatus 3, a large amount of data such as video signals of through images and image data by the second communication method. Thus, the image pickup apparatus 2A can suppress the power consumption and also achieve high-speed communication.

The image pickup apparatus 2A transmits, to each operation apparatus 3, by broadcast communication, information indicating an operation enabling apparatus serving as the operation apparatus 3 from which a control signal is accepted and an operation disabling apparatus serving as the operation apparatus 3 from which no control signal is accepted. This allows each operation apparatus 3 to recognize whether the self apparatus is an operation enabling apparatus or an operation disabling apparatus without causing a lag between the plurality of operation apparatuses 3.

Note that in the above embodiment, the control signal from the operation apparatus 3 is, for example, communication path establishment request, an image pickup operation execution request, an image pickup parameter change request, an image reproduction request, a moving request, or the like. The present invention, however, is not limited to them. A control item controlled by the control signal from the operation apparatus 3 may be arbitrary. For example, the control signal may be a signal for changing an arbitrary control item such as a shooting mode, an AF region, an AE region, a color tone, WB, an AF mode, recording quality, an aspect ratio, a continuous shooting speed, enabling/disabling of a high dynamic range (HDR), enabling/disabling of bracket shooting, an electronic flash setting, a photometry mode, and an image data saving destination. Especially for a function of adding a transition effect in consideration of a fine temporal change in accordance with a status, the user focuses on it and is not aware of other functions in many cases, thus obtaining a high effect. That is, if the operation enabling function unit for accepting a control signal corresponds to a parameter change function capable of changing a parameter in a plurality of stages in accordance with a temporal change, a significant effect is obtained.

An image pickup apparatus or system, to be protected by this application, comprising an image pickup unit configured to generate image data by picking up a target object image, a communication unit configured to communicate with a plurality of operation apparatuses, and a control unit configured to discriminate, among function units forming the image pickup unit, between 1. an operation enabling function unit which accepts a control signal transmitted from one of the plurality of operation apparatuses and 2. an operation enabling function unit which accepts a control signal from the other one of the plurality of operation apparatuses, and control the image pickup unit in accordance with the control signal transmitted from the operation apparatus corresponding to the operation enabling function unit is applicable in various fields, although they look completely different categories. This is because such information input (image pickup, audio recording, and the like) is used in various scenes, complex information input parameters need to be operated flexibly or creatively in accordance with an occasional purpose or a status which changes every moment, and the awareness, attention, and operation ability of one user are limited. When a plurality of users respectively focus on operations for which they are responsible, most effective information acquisition processing according to the status is possible. In a medical scene or the like, it may be necessary to acquire various kinds of biological information, and various kinds of information are acquired to perform analysis. Even in the same biological information acquisition apparatus, specialists may request to acquire information under different conditions. Thus, as in this application, the technique of performing a plurality of operations in cooperation with each other is particularly important. This cooperation is applied to cooperation with artificial intelligence in addition to cooperation between users, as a matter of course. In the case of artificial intelligence, one apparatus may be able to control a plurality of functions. However, a plurality of apparatuses having special functions, which have done different kinds of machine learning, may cooperate with each other, and one of the apparatuses may control the human and the other apparatus may control artificial intelligence.

Although the present invention has been described based on the above embodiments, it is not limited to them. Various modifications and applications can be made within the spirit and scope of the present invention, as a matter of course. For example, in image acquisition, dynamic range or gain control, noise reduction, and the like may be performed. These operation parameters (information input parameters) can be used at the time of acquisition of an audio, and the present invention is not limited to image pickup. That is, the present invention can translate into an information acquisition apparatus or system comprising an information acquisition unit configured to generate information data by acquiring information, a communication unit configured to communicate with a plurality of operation apparatuses, and a control unit configured to discriminate among function units forming the information acquisition unit by determining one of the function units as an operation enabling function unit which accepts a control signal transmitted from the operation apparatus and the other one of the function units as an operation disabling function unit which accepts no control signal and control the information acquisition unit in accordance with the control signal transmitted from the operation apparatus corresponding to the operation enabling function unit. In addition, in the above description of the respective operation flowcharts, "first", "next", and the like are used to explain the operations for the sake of convenience. However, this does not mean that the operations need to be performed in this order.

Each processing according to each embodiment described above can also be stored as a program to be executed by a CPU serving as a computer, or the like. Alternatively, the program can be stored in a storage device of an external storage apparatus such as a memory card, a magnetic disk, an optical disk, or a semiconductor memory and distributed. The CPU or the like can execute the above-described processing by loading the program stored in the storage device of the external storage apparatus, and controlling the operation by the loaded program.

Notes of other modes will be added below.

(Supplementary Note 1)

There is provided an information acquisition apparatus including a first communication function unit (circuit) configured to perform one-way communication (first communication) capable of transmitting the same data to a plurality of operation apparatuses at the same time, and a second communication function unit (circuit) configured to perform two-way transmission/reception (second communication) of data to/from each of the plurality of operation apparatuses, characterized by comprising a communication control unit configured to perform, in the first communication, prior to the second communication, communication to help establishment of the second communication between one of the plurality of operation apparatuses and the information acquisition apparatus.

(Supplementary Note 2)

There is provided the information acquisition apparatus of supplementary note 1, characterized in that the communication control unit of the information acquisition apparatus performs, using the second communication function unit, communication for encouraging the information acquisition apparatus to perform auxiliary communication by the first communication function unit.

(Supplementary Note 3)

There is provided an operation apparatus including a first communication function unit (circuit) configured to acquire data from an information acquisition apparatus by one-way communication (first communication), and a second communication function unit (circuit) configured to perform two-way transmission/reception (second communication) of data to/from the information acquisition apparatus, characterized by comprising a communication control unit configured to perform, in accordance with the first communication, communication to help establishment of the second communication between the information acquisition apparatus and the operation apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image pickup apparatus comprising:
   an imager that generates image data of a target object;
   a communication interface that is communicatively coupled to a first operation apparatus and a second operation apparatus via a network; and
   a central processing unit (CPU) that is communicatively coupled to the imager and the communication interface, wherein the CPU:
   receives, using the communication interface, a first control from the first operation apparatus,
   receives, using the communication interface, a second control from the second operation apparatus,
   determines that the first control and the second control are contradictory when the first control and the second control produce a conflict in control of the image pickup apparatus,
   selects a selected control from either the first control or the second control when the first control and the second control are contradictory, and
   controls the image pickup apparatus in accordance with the selected control, wherein:
   the communication interface utilizes a first communication method and a second communication method,
   the first communication method is communication method with low power consumption, as compared with the second communication method,
   the second communication method is communication method capable of performing high-speed communication, as compared with the first communication method, and
   the communication interface utilizes the first communication method until receiving a control signal using the first communication method to utilize the second communication method.

2. An operation apparatus comprising:
   a communication interface communicatively coupled to an image pickup apparatus via a wireless network; and
   a central processing unit (CPU) communicatively coupled to the communication interface, wherein the CPU:
   transmits, using the communication interface, a first control;
   receives, using the communication interface, information from the image pickup apparatus in response to the first control,
   determines based on the information from the image pickup apparatus whether the image pickup apparatus accepts control from the operation apparatus, wherein the image pickup apparatus accepts control from the operation apparatus when the operation apparatus has a higher priority than another operation apparatus that is attempting a contradictory control of the image pickup apparatus, and
   transmits, using the communication interface, a control signal to the image pickup apparatus when the image pickup apparatus is determined to accept control from the operation apparatus, wherein:
   the communication interface utilizes a first communication method and second communication method,
   the first communication method is communication method with low power consumption, as compared with the second communication method,
   the second communication method is communication method capable of performing high-speed communication, as compared with the first communication method, and
   the communication interface utilizes the first communication method until a request to establish a communication path is transmitted to the image pickup apparatus by the first communication method and it is possible to establish the communication path.

* * * * *